(12) United States Patent
Murakami et al.

(10) Patent No.: US 8,437,511 B2
(45) Date of Patent: May 7, 2013

(54) BIOMETRIC AUTHENTICATION SYSTEM

(75) Inventors: Takao Murakami, Yokohama (JP);
Kenta Takahashi, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 313 days.

(21) Appl. No.: 12/874,647

(22) Filed: Sep. 2, 2010

(65) Prior Publication Data

US 2011/0182480 A1  Jul. 28, 2011

(30) Foreign Application Priority Data

Jan. 26, 2010 (JP) ................................. 2010-013747

(51) Int. Cl.
*G06K 9/00* (2006.01)
(52) U.S. Cl.
USPC .......... 382/115; 340/5.82; 707/725; 707/748; 707/754
(58) Field of Classification Search .................. 340/5.82; 382/115, 124
See application file for complete search history.

(56) References Cited

U.S. PATENT DOCUMENTS

| | | | |
|---|---|---|---|
| 6,229,922 B1 | 5/2001 | Sasakawa et al. | |
| 7,356,168 B2* | 4/2008 | Tavares | 382/115 |
| 8,340,361 B2* | 12/2012 | Murakami et al. | 382/115 |
| 2007/0036400 A1* | 2/2007 | Watanabe et al. | 382/124 |
| 2007/0288452 A1 | 12/2007 | Podilchuk | |
| 2009/0097179 A1* | 4/2009 | Chen | 361/87 |
| 2009/0289760 A1 | 11/2009 | Murakami et al. | |
| 2010/0228692 A1* | 9/2010 | Guralnik et al. | 706/12 |
| 2011/0182480 A1* | 7/2011 | Murakami et al. | 382/115 |

FOREIGN PATENT DOCUMENTS

| | | |
|---|---|---|
| JP | 11-296531 A | 10/1999 |
| JP | 2009-289253 A | 12/2009 |

OTHER PUBLICATIONS

Nandakumar, K., et al., "Fusion in Multibiometric Identification Systems: What About The Missing Data?," Proc. ICB, pp. 743-752, (2009).
Chavez, E., et al. "Searching in Metric Spaces," ACM Computing Surveys, vol. 33, No. 3, pp. 273-321 (2001).

* cited by examiner

*Primary Examiner* — Gregory M Desire
(74) *Attorney, Agent, or Firm* — Volpe and Koenig, P.C.

(57) ABSTRACT

A 1:N identification system having high convenience and safety is to be provided. An authentication client includes at least one biometric information input sensor and a feature extraction function. A database includes an enrollee ID and registered templates of biometric information of at least one kind every enrollee and includes a score table. An authentication server includes a prior probability setting function, a 1:N fast matching function for successively matching the feature with the registered templates of the enrollees and discontinuing matching processing when the number of times of matching has exceeded a predetermined threshold, a delta score calculation function for calculating a delta score by using a score obtained by the 1:N fast matching and using the score table, a posterior probability calculation function for calculating posterior probabilities respectively of the enrollees on the basis of the score and the delta score, and an authentication object user identification function.

11 Claims, 5 Drawing Sheets

FIG.5

|  | $u_1$ | $u_2$ | ... | $u_N$ |
|---|---|---|---|---|
| $u_1$ |  | $r_{12}$ | ... | $r_{1N}$ |
| $u_2$ | $r_{21}$ |  | ... | $r_{2N}$ |
| ⋮ | ⋮ | ⋮ | ⋮ | ⋮ |
| $u_N$ | $r_{N1}$ | $r_{N2}$ | ... |  |

BIOMETRIC AUTHENTICATION SYSTEM

INCORPORATION BY REFERENCE

The present application claims priority from Japanese application JP2010-013747 filed on Jan. 26, 2010, the content of which is hereby incorporated by reference into this application.

BACKGROUND

The present invention relates to a method and system for authenticating an individual by using a biometrical feature that the individual has.

The biometric authentication is known as an authentication technique having an advantage that there is no forgetting and forgery is difficult as compared with authentication based on a password or a Smart card. In the biometric authentication, biometric information is acquired from a user (hereafter referred to as enrollee) and information called feature is extracted from the biometric information and registered, at time of registration. This registration information is called registered template. At time of authentication, a feature extracted from a user (hereafter referred to as authentication object user) is matched with the template, and authentication is conducted by using an obtained similarity which represents how alike two feature are or an obtained score representing a distance which represents how different two feature are (hereafter referred to as score).

Biometric authentication in which the authentication object user is matched with each of N enrollees (hereafter referred to as 1:N matching) to identify which of the enrollees is the same person as the authentication object user is called 1:N biometric identification. It at this time there is an enrollee (hereafter referred to as identified enrollee) identified as the same person as the authentication object user, then the authentication is regarded as successful with the identified enrollee obtained as an identification result. If there isn't an identified enrollee, then the authentication is regarded as unsuccessful. As examples of a biometric authentication system utilizing the 1:N identification, a service record management system and a system for conducting credit account settlement on the basis of biometric authentication without using a credit card (hereafter referred to as card-less credit account settlement system) can be mentioned. The 1:N identification has an advantage of high convenience because the authentication object user need not exhibit a card or the like. However, the 1:N identification has a problem that as the number N of enrollees increases the authentication accuracy is degraded and the authentication time increases because the number of identification objects increases.

According to K. Nandakumar. et al., "Fusion in Multibiometric Identification Systems: What about the Missing Data?," Proc. ICB, pp. 743-752, 2009 (Document 1), in the 1:N identification, a posterior probability that the authentication object user will be each enrollee is calculated on the basis of obtained scores and the user is identified by using the posterior probability.

According to JP-A-H11-296531 ([0008], [0012], FIG. 1, Document 2), which corresponds to U.S. Pat. No. 6,229,922 B1, Sasakawa et al., a similarity table using similarities each of which is a degree of coincidence between two registered data obtained by calculating it for all possible combinations in selecting two out of a plurality of registered data is generated beforehand, and a sequence of registered data to be read subsequently is controlled by using a matching degree between matching data to be matched and registered data and the similarity table. At this time, it is also possible to discontinue the matching processing if the number of times of matching exceeds a predetermined threshold.

SUMMARY

It is possible to implement higher precision by applying the technique according to Document 1 to the 1:N identification and implement faster speed by applying the technique according to Document 2 to the 1:N identification. However, a technique for reconciling the higher precision and higher speed of the 1:N identification has not been proposed so far.

It is also conceivable to combine the technique according to Document 1 with the technique according to Document 2. However, deciding in the technique according to Document 2 to discontinue matching processing at time when the number of times of matching has exceeded the predetermined threshold poses a problem that scores cannot be found for remaining enrollees who are not subjected to matching and the posterior probability cannot be found suitably. Furthermore, deciding in the technique according to Document 2 not to discontinue the matching processing even if the number of times of matching has exceeded the predetermined threshold poses a problem that it becomes necessary to conduct the matching for all enrollees and a faster speed cannot be implemented at all in the worst case.

Herein, a 1:N identification technique which reconciles a faster precision and a faster speed will be disclosed.

In accordance with one aspect of the disclosure, a biometric authentication system includes a database retaining an enrollee ID for each of enrollees, registered templates of biometric information of at least one kind for each of enrollees, and a score table, a prior probability setting function for setting prior probabilities that an authentication object user will be the same person as the respective enrollees, at least one biometric information input sensor for acquiring biometric information of at least one kind from the authentication object sensor, a feature extraction function for extracting a feature from the acquired biometric information, a 1:N fast matching function for using the registered templates respectively of the enrollees with respect to the feature of the authentication object user, rearranging a sequence of the registered templates to be matched while referring to the score table, thereby conducting 1:N fast matching, and discontinuing the matching processing when the number of times of matching has exceeded a predetermined threshold, a delta score calculation function for calculating a delta score by using a score obtained by the 1:N fast matching and using the score table, a posterior probability calculation function for calculating posterior probabilities respectively of the enrollees on the basis of the score and the delta score, and an authentication object user identification function for conducting identification of the authentication object user by comparing in magnitude each of the posterior probabilities with a threshold. (Delta is expressed as 'Δ' in expressions.)

In accordance with an aspect of the disclosure, matching with K registered templates where K is less than N is conducted and the posterior probability is calculated by using the score and delta scores. Therefore, it becomes possible to find the posterior probability more strictly as compared with the conventional technique which conducts 1:N identification using the score or the delta score. Therefore, it becomes possible to raise the authentication precision while holding down the authentication time required since biometric information is input until an authentication result is returned to within a certain fixed value. As a result, an effect that the convenience and safety are improved is obtained.

The above-described mode can be applied to all 1:N identification systems which conduct confirmation of the person in question by using the scores. Therefore, the mode can be applied to all modalities such as a fingerprint, an iris or a vein, and can be applied to matching algorithms of all kinds which output a score. More specifically, the mode can be applied to all applications using biometric authentication such as physical access control, time and attendance management or PC log-in. The "modality" means kinds of biometric information which can be acquired by one sensor.

It becomes possible to raise the authentication precision while keeping the authentication time in biometric authentication short. As a result, it becomes possible to improve the convenience and safety.

Other objects, features and advantages of the invention will become apparent from the following description of the embodiments of the invention taken in conjunction with the accompanying drawings.

BRIEF DESCRIPTION OF THE DRAWINGS

FIG. 5 is a diagram exemplifying a configuration of a score table in the first and second embodiments.

EMBODIMENTS

Hereafter, embodiments will be described with reference to the drawings.

1. First Embodiment

A biometric authentication system in a first embodiment is a biometric authentication system which conducts 1:N identification between an authentication object user and N enrollees each time the authentication object user inputs biometric information.

By the way, it is supposed that the score in the present embodiment is defined by using a similarity. In other words, as two features are alike, the score becomes greater in value. Conversely, if the score is defined by using an unsimilarity, then the score assumes a smaller value as the two features are alike.

Figure 1:
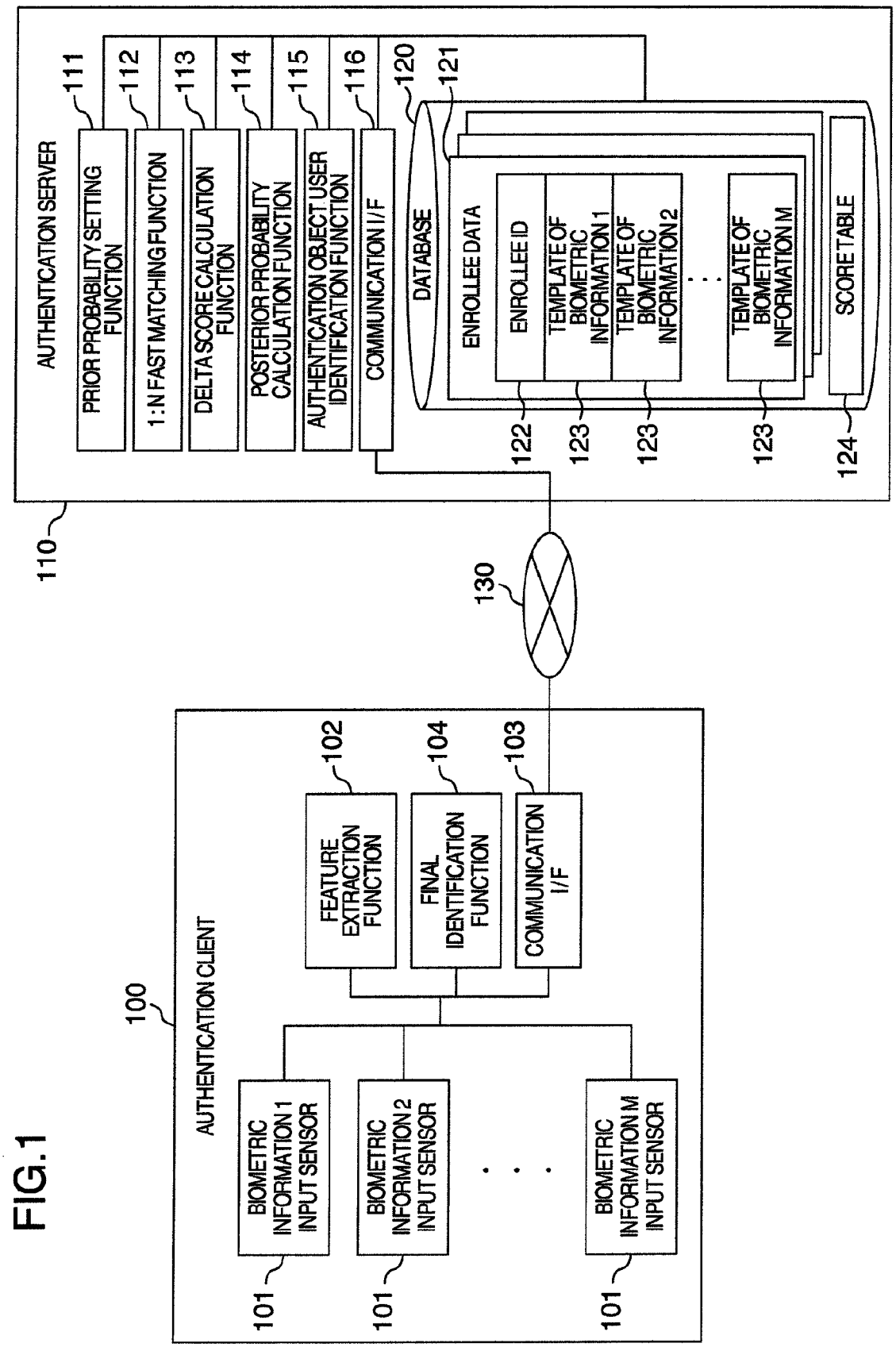
FIG. 1 is a block diagram exemplifying a functional configuration in first and second embodiments.

FIG. 1 shows a configuration example of the biometric authentication system. This system is configured to include an authentication client apparatus (hereafter referred to as authentication client) 100 which conducts direct exchange with an authentication object user, an authentication server apparatus (hereafter referred to as authentication server) 110 which conducts 1:N identification, and a network 130. The network 130 may use a network such as a WAN or a LAN, inter-device communication using the USB or IEEE 1394, or wireless communication such as a portable telephone network or short distance radio.

For example, in the case of a card-less credit account settlement system, a configuration in which the authentication client 100 is an authentication apparatus placed in a member store, the authentication server 110 is a server placed in a data center, and the network 130 is the Internet is conceivable. In the case of an entrance-leaving management system, a configuration in which the authentication client 100 is an authentication apparatus placed at a building entrance or in a room, the authentication server 110 is a server placed in a server room, and the network 130 is an intra-enterprise intranet is conceivable. Although the authentication client 100 is separated from the authentication server 110 here, they may be put together as one apparatus.

The authentication client 100 is configured to include a biometric information input sensors 101 respectively capable of acquiring biometric information 1 to biometric information M of an authentication object user, a feature extraction function 102 for extracting a feature from the acquired biometric information, a communication I/F 103, and a final identification function 104 for conducting final identification on the basis of an identification result of the authentication object user sent from the authentication server 110. The number M of kinds of biometric information may be one (M=1) or a plurality (M>1). The plurality of kinds of biometric information may be formed of different modalities such as, for example, a fingerprint, an iris, and a voiceprint, or may be formed of different regions of the same modality such as a fingerprint of a forefinger, a fingerprint of a middle finger, and a fingerprint of a medical finger. If the plurality kinds of biometric information are formed of different regions of the same modality, one input sensor suffices.

The authentication server 110 is configured to include a prior probability setting function 111 for setting a probability of the authentication object user being the same person as each enrollee (hereafter referred to as prior probability, which may include a probability of the authentication object user being a non-enrollee) before a score is obtained, a 1:N fast matching function 112 for conducting 1:N fast matching by using a feature of the authentication object user sent from the authentication client 100, a delta score calculation function 113 for calculating a delta score which is a distance between scores on the basis of a score obtained as a result of the 1:N matching and a score table described later, a posterior probability calculation function 114 for calculating a probability of the authentication object user being the same person as each enrollee (hereafter referred to as posterior probability, which may be a probability of the authentication object user being a non-enrollee) by using the scores and the delta scores, an authentication object user identification function 115 for identifying the authentication object user as the same person as an enrollee or a non-enrollee on the basis of the posterior probability, a communication I/F 116, and a database 120.

The database 120 retains enrollee data 121 for N enrollees and a score table 124 which stores scores between registered templates. The enrollee data 121 is configured to include an enrollee ID 122 and registered templates 123 of biometric information 1 to biometric information M.

Figure 5:
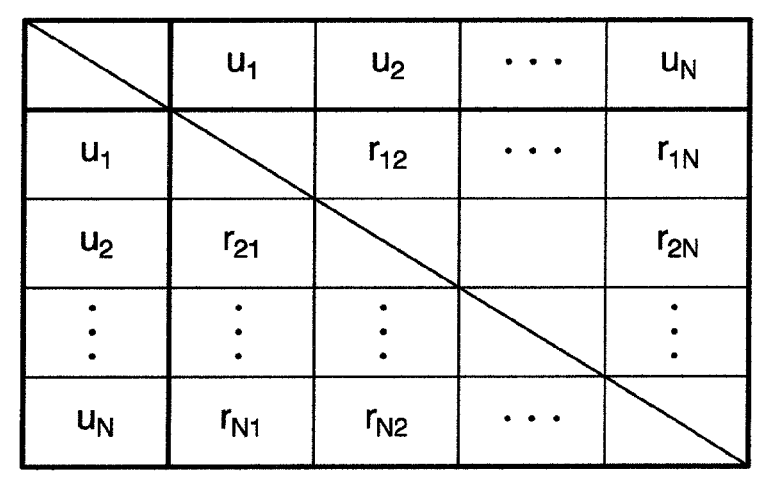

The score table 124 retains a score $r_{ij}$ ($1 \leq i \leq N$, $1 \leq j \leq N$, i is not equal to j) between registered templates of the ith enrollee and the jth enrollee every kind of biometric information. FIG. 5 shows a configuration diagram of the score table 124. Although this is an N by N matrix, a part thereof may be retained as the score table 124. For example, it is also possible to select L (<N) registered templates out of N registered templates as representatives and retain (a total of L*N) scores between the L registered templates and the N registered templates (* means multiplication). The score table 124 is generated since N enrollees are registered until authentication is conducted.

Figure 2:
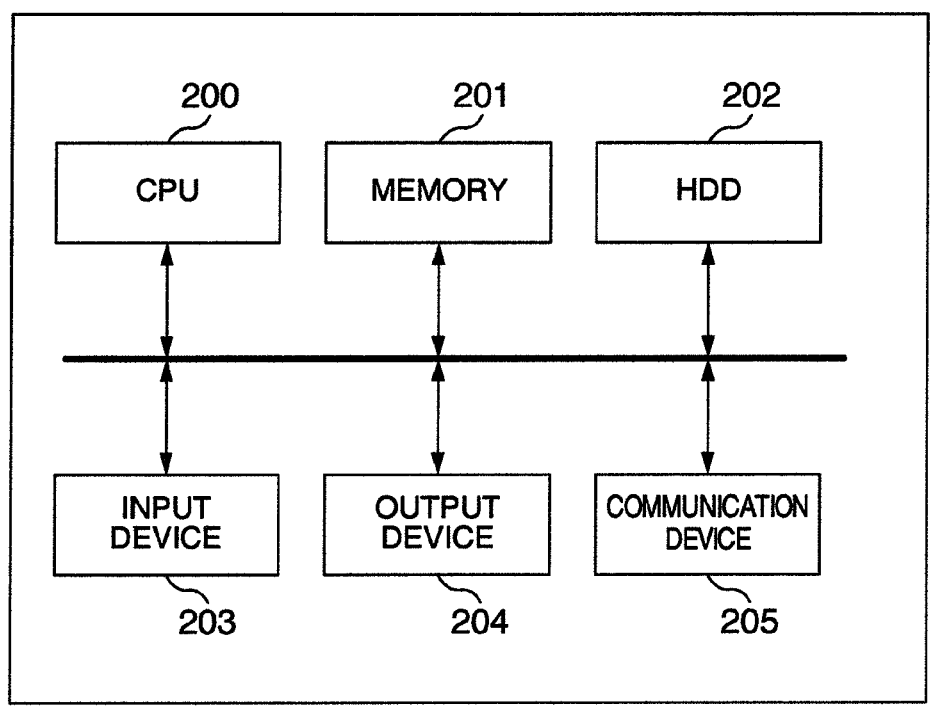
FIG. 2 is a block diagram exemplifying a hardware configuration in the first and second embodiments.

FIG. 2 shows a hardware configuration for implementing the authentication client 100 and the authentication server 110. These apparatuses can be configured by using a typical computer which includes a CPU 200, a memory 201, a secondary storage device 202 such as a HD, an input device 203 such as a keyboard, an output device 204 such as a display device and a printer, and a communication device 205.

In addition, the functions, the sensors and the communication I/F included in each apparatus are implemented on the computer by execution of a program by the CPU 200 or cooperation with hardware. Each program may be previously stored in the secondary storage device 202 in the computer, or may be introduced from another device to the secondary storage device 202 via an external interface which is not illustrated or the communication device 205 and a medium which can be utilized by the computer. The "medium" means, for example, a storage medium which can be attached to or detached from an input/output interface or a communication medium (i.e., a wired, wireless or optical network, or a carrier wave or a digital signal propagated through the network). The calculated prior probability and posterior probability are retained in the memory 201.

Figure 3:
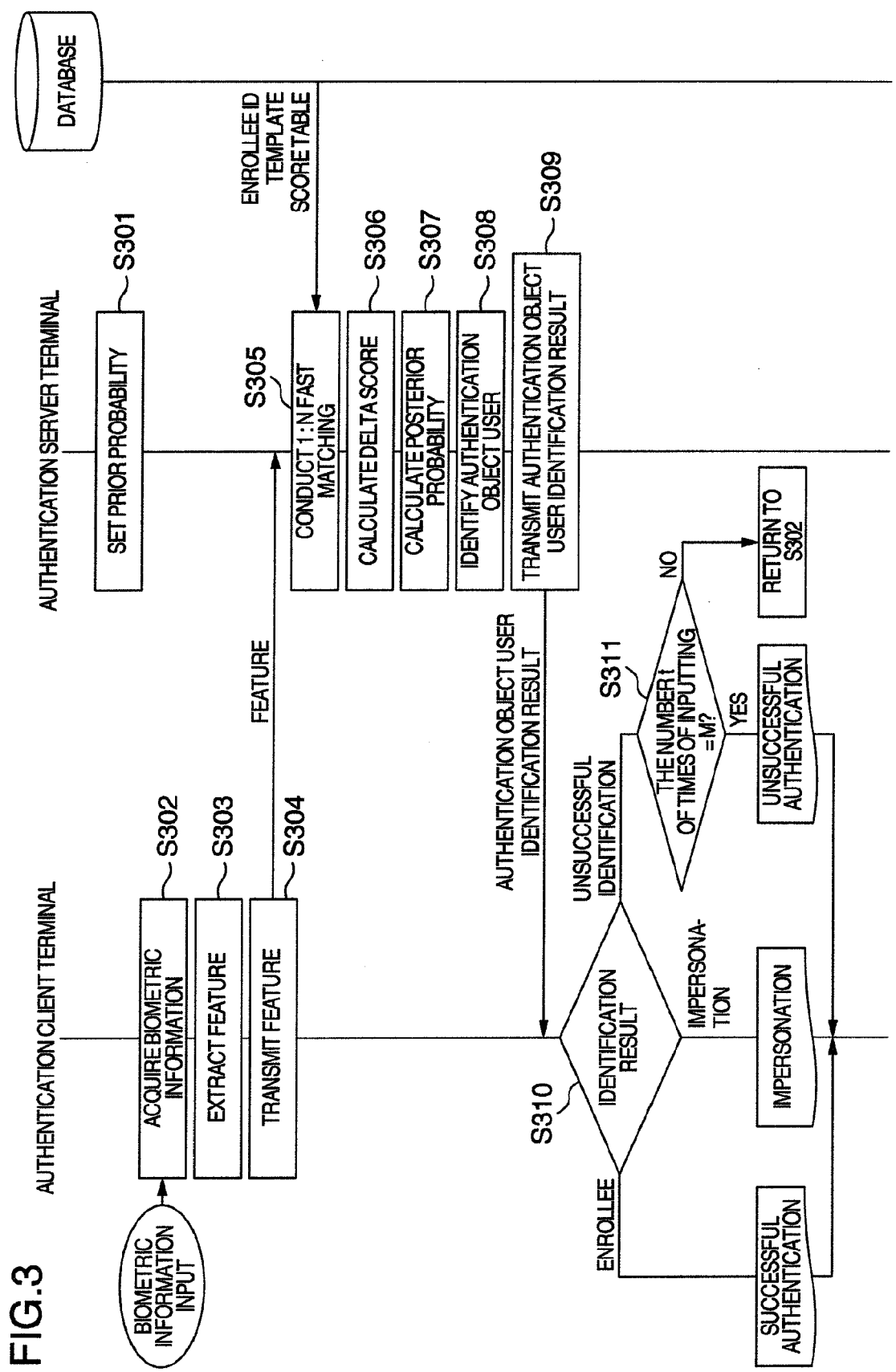
FIG. 3 is a flow diagram exemplifying authentication processing in the first embodiment.

FIG. 3 shows a processing procedure and a data flow of authentication in the present embodiment.

The prior probability setting function 111 sets a prior probability $P(v=u_n)$ of each enrollee $u_n$ ($1=<n=<N$) and a prior probability $P(v=u_0)$ of a non-enrollee $u_0$ (step S301). The prior probabilities may be set to be equal as represented by the following expressions.

$$P(v=u_n)=1/(N+1)(1=<n=<N) \quad \text{(Expression 1)}$$

$$P(v=u_0)=1/(N+1) \quad \text{(Expression 2)}$$

Or the prior probabilities of each enrollee and the non-enrollee may be updated by using past final identification results as disclosed in JP-A-2009-289253 (corresponding to US2009/0289760A1, Murakami et al.) by the present applicant (hereafter referred to as Document 3). For example, according to a method, final identification results ("successful authentication," "impersonation," or "unsuccessful authentication") of past D times are retained in the database 120. Supposing that the number of times the final identification result became "impersonation" in the past authentication processing of D times is $D_0$, the prior probability $P(v=u_n)$ of each enrollee $u_n$ and the prior probability $P(v=u_0)$ of the non-enrollee $u_0$ are set as represented by the following expressions.

$$P(v=u_n)=(1-D_0/D)/(N+1) \ (1=n=<N) \quad \text{(Expression 3)}$$

$$P(v=u_0)=(N*D_0/D+1)/(N+1) \quad \text{(Expression 4)}$$

One of M biometric information input sensors 101 acquires biometric information of the authentication object user v. It is now supposed that the number of times the authentication object user v has input biometric information so far is t (step S302).

The feature extraction function 102 extracts a feature from each acquired biometric information (step S303).

The communication I/F 103 transmits each feature to the authentication server 110 (step S304).

The 1:N fast matching function 112 conducts 1:N matching between the feature sent from the authentication client 100 and registered templates 123 of K (<N) persons where K is a predetermined threshold among N enrollees. As a result, scores for K enrollees are obtained. The value of K may differ every sent feature. Supposing that a number of an enrollee in the ith (where $1=<i=<K$) matching is m(i) ($1=<m(i)=<N$), the score of the enrollee is represented by $s_{tm(i)}$ (where t is the number of times of inputting as described earlier) (step S305).

By conducting matching for K (<N) enrollees in this way, 1:N matching in a shorter time becomes possible as compared with the case where matching is conducted for N enrollees. As a result, authentication can be conducted faster and an effect of improved convenience is obtained.

By the way, when conducting the 1:N matching, the sequence of the registered templates 123 to be matched may be rearranged by referring to the whole or a part of obtained scores and the score table 124 while conducting the matching. Specifically, the same technique as that according to Document 2 may be used. Or any one of similarity search techniques described in E. Chavez et al., "Seaching in Metric Spaces", ACM Computing Surveys, vol. 33, no. 3, pp. 273-321 (2001) may be used. Furthermore, the sequence of registered templates 123 to be matched may be rearranged by using scores and delta scores described later, which are obtained until now.

The delta score calculation function 113 calculates a delta score which represents how two scores (scalars) differ by using the obtained score and the score table 124. Specifically, for example, $$\Delta s_{tim(j)}=|s_{tm(j)}-r_{im(j)}|(1=<i=<N, 1=<j=<K, i \text{ is not equal to } j) \quad \text{(Expression 5)}$$

is found. In Expression 5, the delta score is defined as an absolute value of a difference between two scores. However, powers or roots of the two score values, two score values multiplied respectively by constants, or the sum of the two score values may be used in the definition of the delta score. If a part of the N by N matrix is retained as the score table, a part of delta scores cannot be calculated in some cases. The posterior probability calculation method in this case will be described later. (step S306).

The posterior probability calculation function 114 calculates a posterior probability $P(v=u_n|S_1, \ldots, S_t, \Delta S_1, \Delta S_t)$ of each enrollee $u_n$ ($1=<n=<N$) and a posterior probability $P(v=u_0|S_1, \ldots, S_t, \Delta S_1, \Delta S_t)$ of a non-enrollee $u_0$ by using the scores and the delta scores obtained so far. Here, $$S_t=\{s_{tm(i)}|1=<i=<K\} \quad \text{(Expression 6)}$$

$$\Delta S_t=\{\Delta s_{tim(j)}|1=<i=<N, 1=<j=<K, i \text{ is not equal to } j\} \quad \text{(Expression 7)}$$

(step S307). Details of a method for calculating the posterior probability will be described later.

The authentication object user identification function 115 identifies the authentication object user v by comparing the posterior probability obtained at the step S307 with a predetermined threshold A. Specifically, if there is at least one posterior probability exceeding the threshold A among the posterior probabilities $P(v=u_n|S_1, \ldots, S_t, \Delta S_1, \ldots, \Delta S_t)$ of respective enrollees $u_n$ ($1=<n=<N$) and the posterior probability $P(v=u_0|S_1, \ldots, S_t, \Delta S_1, \ldots, \Delta S_t)$ of a non-enrollee $u_0$, an enrollee or a non-enrollee who has implemented a maximum value is regarded as an identification result. If there is no posterior probability exceeding the threshold A, the identification is regarded as unsuccessful (step S308).

The communication I/F 116 transmits the identification result obtained at the step S308 to the authentication client 100. Specifically, if the identification result of the authentication object user is an enrollee, the communication I/F 116 transmits an identified enrollee ID 122. If the identification result of the authentication object user is a non-enrollee, the communication I/F 116 transmits "impersonation." If the identification is unsuccessful, the communication I/F 116 transmits "unsuccessful identification" (step S309).

If the identification result of the authentication object user sent from the authentication server 110 is the enrollee ID 122, the final identification function 104 determines the final result to be "successful authentication." If the identification result of the authentication object user is "impersonation," the final identification function 104 determines the final result to be "impersonation." If the identification result of the authentication object user is "unsuccessful identification," the processing proceeds to step S311 (step S310). If "impersonation" is determined to be the final result, penal regulations to the authentication object user such as temporary lock of the authentication client 100 or alarm sounding may be provided as described in Document 3. An effect obtained by providing penal regulations to the authentication object user will be described later.

If the number t of times of biometric information inputting has reached M, the final identification function 104 determines the final result to be "unsuccessful authentication." Unless the number t of times of biometric information inputting has reached M, the processing returns to the step S302 (step S311). If "unsuccessful authentication" is determined to be the final result, the authentication object user may be ordered to retry the authentication.

Hereafter, the method for calculating the posterior probability at the step S307 will be described in detail.

Supposing that a set of scores at respective inputs $S_1, \ldots, S_t$ is independent and a set of delta scores $\Delta S_1, \ldots, \Delta S_t$ is independent, the posterior probability $P(v=u_k|S_1, S_t, \Delta S_1, \ldots, \Delta S_t)(0 =< N)$ can be represented by Expression 8 according to the Bayes theory.

$$P(v = u_k \mid S_1, \ldots, S_t, \Delta S_1, \ldots, \Delta S_t) = \frac{P(v = u_k \mid S_1, \ldots, S_{t-1}, \Delta S_1, \ldots, \Delta S_{t-1}) Z_{tk}}{\sum_{n=0}^{N} P(v = u_k \mid S_1, \ldots, S_{t-1}, \Delta S_1, \ldots, \Delta S_{t-1}) Z_{tn}}$$ (Expression 8)

Here, $$Z_{tk} = \frac{P(S_t, \Delta S_t \mid v = u_k)}{P(S_t, \Delta S_t \mid v = u_0)}$$ (Expression 9)

$Z_{tk}$ is referred to as likelihood rate. Since $P(v=u_k|S_1, \ldots, S_{t-1}, \Delta S_1, \ldots, \Delta S_{t-1})$ is a posterior probability at the time when up to the last feature is obtained, the posterior probability $P(v=u_k|S_1, \ldots, S_t, \Delta S_1, \ldots, \Delta S_t)$ can be found recursively by using the prior probability $P(v=u_k)$ and $Z_{tk}$.

It is supposed that respective scores are independent and the following expressions hold true $$P(s_{tm(i)}|v=u_k)=f(s_{tm(i)}) \text{ (when } m(i)=k)$$ (Expression 10)

$$P(s_{tm(i)}|v=u_k)=g(s_{tm(i)}) \text{ (when } m(i) \text{ is not equal to } k)$$ (Expression 11)

where $0=<k=<N$. In other words, it is supposed that scores s between the person in question and the person in question follow the genuine distribution $f(s)$ and scores s between others follow impostor distribution $g(s)$.

Furthermore, it is supposed that respective delta scores are independent and the following expressions hold true $$P(\Delta s_{tim(j)}|v=u_k)=f'(s_{tm(i)}) \text{ (when } i=k)$$ (Expression 12)

$$P(\Delta s_{tim(j)}|v=u_k)=g'(s_{tm(i)}) \text{ (when } i \text{ is not equal to } k)$$ (Expression 13)

where $0=<k=<N$. In other words, it is supposed that delta scores $\Delta s$ between the person in question and the person in question follow the genuine distribution $f'(s)$ and delta scores $\Delta s$ between others follow impostor distribution $g'(s)$. In the ensuing description, it is assumed that these suppositions hold true.

If it is supposed that the scores and the delta scores are completely independent, the likelihood rate $Z_{tk}$ $(0=<k=<N)$ can be found as follows:

$$Z_{tk} = \frac{P(S_t, \Delta S_t \mid v = u_k)}{P(S_t, \Delta S_t \mid v = u_0)}$$ (Expression 14)

$$= \frac{\prod_{i=1}^{K} P(s_{tm(i)} \mid v = u_k) \prod_{i=1}^{N} \prod_{j=1}^{K} P(\Delta s_{Tim(j)} \mid v = u_k)}{\prod_{i=1}^{K} P(s_{tm(i)} \mid v = u_0) \prod_{i=1}^{N} \prod_{j=1}^{K} P(\Delta s_{Tim(j)} \mid v = u_0)}$$

$$= \begin{cases} f(s_{tk})/g(s_{tk}) \prod_{j=1, j \neq k}^{K} f'(\Delta s_{tkm(j)})/g'(\Delta s_{tkm(j)}) \\ \quad \begin{pmatrix} \text{when } k \text{ is not equal to 0 and matching} \\ \text{with the } kth \text{ enrollee is conducted} \end{pmatrix} \\ \prod_{j=1}^{K} f'(\Delta s_{tkm(j)})/g'(\Delta s_{tkm(j)}) \\ \quad \begin{pmatrix} \text{when } k \text{ is not equal to 0 and matching} \\ \text{with the } kth \text{ enrollee is not conducted} \end{pmatrix} \\ 1 \quad (\text{when } k = 0) \end{cases}$$

As for $f(s)$, $g(s)$, $f'(\Delta s)$ and $g'(\Delta s)$, a model such as the normal distribution, gamma distribution or beta beta binomial distribution is supposed and the authentication server is caused to learn parameters by using a technique such as the maximum likelihood estimation, the MAP estimation, or the Bayes estimation since N enrollees are registered until authentication is conducted.

Or $f(s)/g(s)$ and $f'(\Delta s)/g'(\Delta s)$ may be learned directly by using logistic regression. Although $f(s)$ and $g(s)$ are caused to be learned beforehand every modality, the same distribution may be used if different regions of the same modality are used.

Furthermore, $f(s)$, $g(s)$, $f'(\Delta s)$, $g'(\Delta s)$, $f(s)/g(s)$ and $f'(\Delta s)/g'(\Delta s)$ may be learned in common to all users, may be learned every user, or may be learned every pair of the authentication object user and an enrollee.

Supposing that the scores and the delta scores are completely dependent, the delta scores are not used for enrollees subjected to the matching, and a number of an enrollee which is not subjected to the matching is $n(i)$ $(1=<i=<N-K, 1=<n(i)=<N)$, the likelihood rate $Z_{tk}$ $(0=<k=<N)$ can be found by using the following expression.

$$Z_{tk} = \frac{P(S_t, \Delta S_t \mid v = u_k)}{P(S_t, \Delta S_t \mid v = u_0)}$$ (Expression 15)

$$= \frac{\prod_{i=1}^{K} P(s_{tm(i)} \mid v = u_k) \prod_{i=1}^{N-K} \prod_{j=1}^{K} P(\Delta s_{Tn(i)m(j)} \mid v = u_k)}{\prod_{i=1}^{K} P(s_{tm(i)} \mid v = u_0) \prod_{i=1}^{N-K} \prod_{j=1}^{K} P(\Delta s_{Tn(i)m(j)} \mid v = u_0)}$$

$$= \begin{cases} f(s_{tk})/g(s_{tk}) \\ \quad \begin{pmatrix} \text{when } k \text{ is not equal to 0 and matching} \\ \text{with the } kth \text{ enrollee is conducted} \end{pmatrix} \\ \prod_{j=1}^{K} f'(\Delta s_{tkm(j)})/g'(\Delta s_{tkm(j)}) \\ \quad \begin{pmatrix} \text{when } k \text{ is not equal to 0 and matching} \\ \text{with the } kth \text{ enrollee is not conducted} \end{pmatrix} \\ 1 \quad (\text{when } k = 0) \end{cases}$$

Or supposing that the scores and the delta scores are independent to some degree, the likelihood rate $Z_{tk}$ ($0 =< k =< N$) can be found by using the following expression.

$$Z_{tk} = \begin{cases} f\ (s_{tk})/g(s_{tk}) \times \left[\prod_{j=1, j \neq k}^{K} \frac{f'(\Delta s_{tkm(j)})}{g'(\Delta s_{tkm(j)})}\right]^a & \text{(Expression 16)} \\ \quad \begin{pmatrix} \text{when } k \text{ is not equal to 0 and matching with} \\ \text{the } kth \text{ enrollee is conducted} \end{pmatrix} \\ \prod_{j=1}^{K} f'(\Delta s_{tkm(j)})/g'(\Delta s_{tkm(j)}) \\ \quad \begin{pmatrix} \text{when } k \text{ is not equal to 0 and matching with} \\ \text{the } kth \text{ enrollee is not conducted} \end{pmatrix} \\ 1 \quad (\text{when } k = 0) \end{cases}$$

The parameter a ($0 =< a =< 1$) is a parameter which indicates the degree of independence of the scores and delta scores. When a=1, the expression coincides with the expression obtained by supposing that the scores and the delta scores are completely independent. When a=0, the expression coincides with the expression obtained by supposing that the scores and the delta scores are completely dependent. In other words, Expression 16 coincides with Expression 14 when a=1, whereas Expression 16 coincides with Expression 15 when a=0.

Or the likelihood rate $Z_{tk}$ ($0 =< k =< N$) may be found by using the following expression.

$$Z_{tk} = \begin{cases} f\ (s_{tk})/g(s_{tk}) \times \left[\prod_{j=1, j \neq k}^{K} \frac{f'(\Delta s_{tkm(j)})}{g'(\Delta s_{tkm(j)})}\right]^{ab_1} & \text{(Expression 17)} \\ \quad \begin{pmatrix} \text{when } k \text{ is not equal to 0 and matching} \\ \text{with the } kth \text{ enrollee is conducted} \end{pmatrix} \\ \left[\prod_{j=1}^{K} f'(\Delta s_{tkm(j)})/g'(\Delta s_{tkm(j)})\right]^{b_2} \\ \quad \begin{pmatrix} \text{when } k \text{ is not equal to 0 and matching} \\ \text{with the } kth \text{ enrollee is not conducted} \end{pmatrix} \\ 1 \quad (\text{when } k = 0) \end{cases}$$

Parameters $b_1$ and $b_2$ ($b_1 => 0$, $b_2 => 0$) are parameters for adjusting the influence of $f'(\Delta s)/g'(\Delta s)$ upon the likelihood rate $Z_{tk}$, i.e., the influence of the delta scores upon the likelihood rate $Z_{tk}$. As $b_1$ and $b_2$ become greater, the influence becomes more intense. When $b_1=b_2=1$, Expression 17 coincides with Expression 16.

When retaining a part of an N by N matrix as the score table 124, a part of delta scores $\Delta s$ cannot be calculated in some cases. At that time, a method of setting the corresponding $f'(\Delta s)/g'(\Delta s)$ equal to 1 is conceivable. By doing so, it becomes possible to calculate the likelihood rate $Z_{tk}$, and consequently it becomes possible to calculate the posterior probability as well.

In the present embodiment, the matching processing is discontinued at time when the number of times of matching has exceeded the predetermined threshold K and thereafter the likelihood rate and the posterior probability are calculated by using both the scores and the delta scores as observed data, in this way.

In Document 1, a method of setting f(s)/g(s) equal to 1 for an enrollee having a score s which cannot be found is pro-posed. When this technique is used, the likelihood rate $Z_{tk}$ ($0 =< k =< N$) is found by using the following expression.

$$Z_{tk} = \begin{cases} f\ (s_{tk})/g(s_{tk}) & \text{(Expression 18)} \\ \quad \begin{pmatrix} \text{when } k \text{ is not equal to 0 and matching} \\ \text{with the } kth \text{ enrollee is conducted} \end{pmatrix} \\ 1 \quad \begin{pmatrix} \text{when } k \text{ is not equal to 0 and matching} \\ \text{with the } kth \text{ enrollee is not conducted} \end{pmatrix} \\ 1 \quad (\text{when } k = 0) \end{cases}$$

This corresponds to the case where $b_1=b_2=0$ is set in Expression 17, i.e., the case where it is supposed that there is no influence of the delta scores upon the likelihood rate $Z_{tk}$ in Expression 17. In this case, however, the likelihood rate is not found strictly by using the delta scores for the enrollee having a score which is not found. Therefore, then the posterior probability cannot be found strictly.

On the other hand, in the present embodiment, the likelihood rate can be found more strictly as compared with the case where the likelihood rate is set equal to 1, by using the delta scores even for an enrollee having a score which cannot be found. As a result, the posterior probability can also be found more strictly.

Furthermore, in the present embodiment, the posterior probability is calculated by using the scores and the delta scores. Therefore, it becomes possible to find the posterior probability more strictly as compared with the conventional technique of conducting 1:N identification by using the scores or the delta scores. In the present embodiment, therefore, it becomes possible to enhance the authentication precision while limiting an authentication time required since biometric information is input until an authentication result is returned to within a certain fixed value. As a result, an effect that the convenience and safety are improved is obtained.

Hereafter, the method of rearranging the sequence of registered templates 123 to be matched by using the scores and the delta score described later which are obtained so far at the step S305 will be described in detail. For example, in a conceivable method, a likelihood rate $Z_{t-1k}$ ($1 =< k =< N$) found at the (t-1)th input is substituted into a likelihood rate $Z_{tk}$ ($1 =< k =< N$) and the likelihood rate $Z_{tk}$ ($1 =< k =< N$) is also always updated by using the obtained scores and delta scores while conducting matching in the descending order of the value. For example, in the case where Expression 14 is used as the likelihood rate $Z_{tk}$ ($1 =< k =< N$), matching should be conducted in the following sequence.

1. A likelihood rate $Z_{t-1k}$ ($1 =< k =< N$) found at the (t-1)th input is substituted into a likelihood rate $Z_{tk}$ ($1 =< k =< N$) ($Z_{tk}$ is set to $Z_{tk}=1$ ($1 =< k =< N$) when t=1). Furthermore, j is set to j=1.

2. Matching is conducted with an enrollee having the highest likelihood rate $Z_{tk}$ ($1 =< k =< N$) among enrollees who are not yet subjected to matching, and a score $s_{tm(j)}$ is found (where m(j) is a number of an enrollee subjected to matching). If there are a plurality of enrollees having the highest likelihood rate $Z_{tk}$, matching may be conducted with any of them.

3. Then, $f(s_{tm(j)})/g(s_{tm(j)})$ is added to a likelihood rate $Z_{tm(j)}$ of the m(j)th enrollee.

4. Then, $\Delta s_{tkm(j)} = |s_{tm(j)} - r_{km(j)}|$ ($1 =< k =< N$, $k =< N$, k is not equal to m(j)) is found while referring to the score table 124. And $f'(\Delta s_{tkm(j)})/g'(\Delta s_{tkm(j)})$ is added to the likelihood rate $Z_{tk}$ of all enrollees k (k is not equal to m(j)) other than the m(j)th enrollee.

5. Unity is added to j, and return to 2 is conducted.

According to the above-described method, it becomes possible to find the likelihood rate $Z_{tk}$ ($1=\leq k=\leq N$) by using the scores and the delta scores obtained until then, every time matching is conducted and conduct the next matching with an enrollee having the highest value of the likelihood rate $Z_{tk}$. Since the possibility that the enrollee having a high likelihood rate is the person in question is high at this time, it becomes possible to conduct matching with the person in question at an earlier stage.

Furthermore, in this method, the matching sequence is rearranged by using the scores and the delta scores obtained in the past (until the (t−1)th time) as well. This results in an effect that a farther faster 1:N fast matching can be implemented as compared with the method of rearranging the matching sequence without using the scores and the delta scores obtained in the past (until the (t−1)th time) (for example, the method of always setting $Z_{tk}=1$ ($1=\leq k=\leq N$) in the above-described first processing).

In the above-described example, the likelihood rate is calculated by using Expression 14. Alternatively, a different expression such as Expression 15 or Expression 16 may be used. In the above-described example, the likelihood rate is updated. Alternatively, a different one such as the posterior probability may be updated.

In Document 1, the posterior probability $P(v=u_0|S_1, \ldots, S_t, \Delta S_1, \ldots, \Delta S_t)$ of a non-enrollee $u_0$ is not calculated. When an unenrollee attempts impersonation in this case, small scores (here, similarities) are obtained for all enrollees. If one of them is larger than others, however, the possibility that the posterior probability corresponding to it assumes a large value is high. This results in a problem of high possibility that "successful authentication" is identified. On the other hand, in the present embodiment, the posterior probability $P(v=u_0|S_1, \ldots, S_t, \Delta S_1, \ldots, \Delta S_t)$ of a non-enrollee $u_0$ is also calculated. If the non-enrollee attempts impersonation in this case and small scores (here, similarities) are obtained for all enrollees, then $Z_{tk}$ ($1=\leq k=\leq N$) of every enrollee becomes a small value (<<1) and consequently the posterior probability $P(v=u_0|S_1, \ldots, S_t, \Delta S_1, \ldots, \Delta S_t)$ of the non-enrollee $u_0$ becomes large. As a result, the possibility that "successful authentication" is identified is low, whereas the possibility that "impersonation" is identified is high. As a result, an effect that the safety is further improved is obtained.

In addition, in the present embodiment, "impersonation" is determined to be the final result when the authentication object user is identified as a non-enrollee. When a decision cannot be made who is the authentication object user, "unsuccessful authentication" is determined to be the final result. A clear distinction is made between these two final results. When a non-enrollee attempts impersonation, therefore, penal regulations to the authentication object user such as temporary lock of the authentication client 100 or alarm sounding can be provided. When "unsuccessful authentication" is determined to be the final result, penal regulations can be adapted to be not provided. As a result, an effect that the safety can be further improved is obtained.

2. Second Embodiment

A biometric authentication system in a second embodiment is a biometric authentication system which conducts 1:N identification between an authentication object user and N enrollees after the authentication object user is caused to input M (=>1) pieces of biometric information. By the way, in the present embodiment as well, it is supposed that the score is defined by using a similarity. In other words, as two feature are alike, the score becomes greater in value.

A configuration example of the biometric authentication system in the present embodiment is the same as that shown in FIG. 1.

A hardware configuration of the authentication client 100 and the authentication server 110 in the present embodiment is the same as that shown in FIG. 2.

Figure 4:
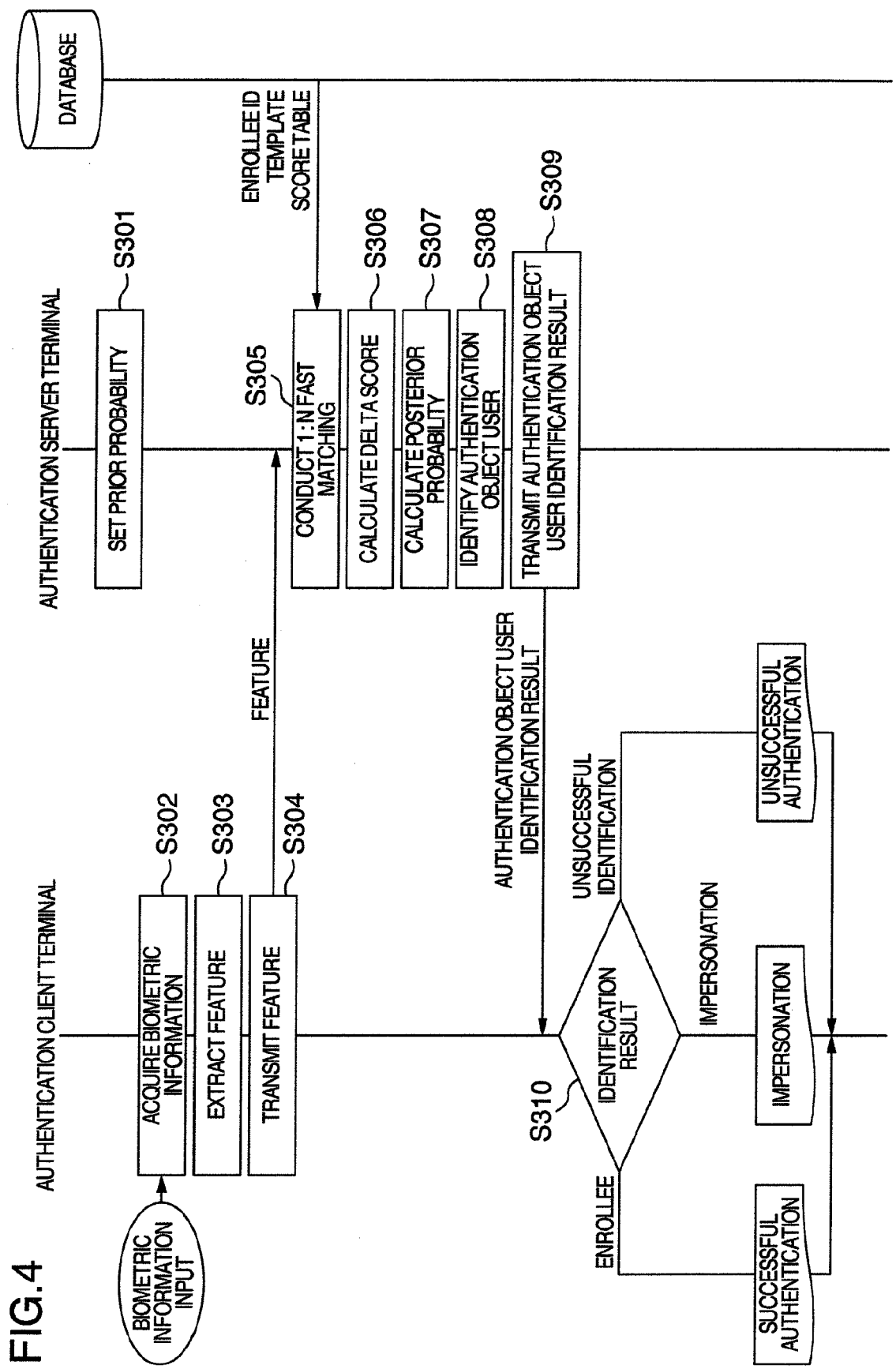
FIG. 4 is a flow diagram exemplifying authentication processing in the second embodiment.

FIG. 4 shows a processing procedure and a data flow of authentication in the present embodiment. Here, a difference of them from those in FIG. 3 will be described. By the way, in the present processing procedure, the step S311 is eliminated.

Each of M biometric information input sensors 101 acquires biometric information of the authentication object user v. As a result, M pieces of biometric information are obtained (step S302).

The feature extraction function 102 extracts a feature from each acquired biometric information (step S303).

The communication I/F 103 transmits each feature to the authentication server 110 (step S304).

The 1:N fast matching function 112 conducts 1:N fast matching between each feature sent from the authentication client 100 and registered templates 123 of N enrollees while referring to the score table 124 on the basis of the distance index method. It is supposed that as a result as regards tth (where $1=\leq t=\leq M$) feature among respective sent feature scores for K (=<N) users are obtained. The value of K may differ every sent feature. Supposing that a number of an enrollee in the ith (where $1=\leq i=\leq K$) matching is m(i) ($1=\leq m(i)=\leq N$), the score of the enrollee is represented by $s_{tm(i)}$ (where t is a number of times of inputting as described earlier) (step S305).

The delta score calculation function 113 calculates a delta score by using the obtained score and the score table 124. Specifically, $$\Delta s_{tim(j)} = |s_{tm(j)} - r_{im(j)}| (1=t=\leq M, 1=\leq i=\leq N, 1=\leq j=\leq K, i \text{ is not equal to } j) \quad \text{(Expression 19)}$$

is found (step S306).

The posterior probability calculation function 114 calculates a posterior probability $P(v=u_n|S_1, \ldots, S_M, \Delta S_1, \ldots, \Delta S_M)$ of each enrollee $u_n$ ($1=\leq n=\leq N$) and a posterior probability $P(v=u_0|S_1, \ldots, S_M, \Delta S_1, \ldots, \Delta S_M)$ of a non-enrollee $u_0$ by using the scores and the $\Delta$ scores obtained so far. Here, $$S_t = \{s_{tm(i)} | 1=\leq i=\leq K\} (1=\leq t=\leq M) \quad \text{(Expression 20)}$$

$$\Delta S_t = \{s_{tim(j)} | 1=\leq i=\leq N, 1=\leq j=\leq K, i \text{ is not equal to } j\} (1=\leq t=\leq M) \quad \text{(Expression 21)}$$

(step S307). The method for calculating the posterior probability is the same as that in the first embodiment.

The authentication object user identification function 115 identifies the authentication object user v by comparing the posterior probability obtained at the step S307 with a predetermined threshold A. Specifically, if there is at least one posterior probability exceeding the threshold A among the posterior probabilities $P(v=u_n|S_1, \ldots, S_M, \Delta S_1, \ldots, \Delta S_M)$ ($1=\leq n=\leq N$) and the posterior probability $P(v=u_0|S_1, \ldots, S_M, \Delta S_1, \ldots, \Delta S_M)$, $u_n$ who has implemented a maximum value is regarded as an identification result. If there is no posterior probability exceeding the threshold A, the identification is regarded as unsuccessful (step S308).

If the identification result of the authentication object user sent from the authentication server 110 is the enrollee ID 122, the final identification function 104 determines the final result to be "successful authentication." If the identification result of the authentication object user is "impersonation," the final identification function 104 determines the final result to be "impersonation." If the identification result of the authentication object user is "unsuccessful identification," the final identification function 104 determines the final result to be "unsuccessful authentication." If "unsuccessful authentication" is determined to be the final result, the authentication object user may be ordered to retry the authentication (step S310).

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A biometric authentication system comprising:
    a database retaining an enrollee ID for each of N enrollees, registered templates of biometric information of at least one kind for each of N enrollees, and a score table for recording scores, each of the scores representing a similarity between a registered template and a corresponding registered template of another enrollee;
    a prior probability setting function for setting prior probabilities that an authentication object user will be same person as the respective enrollees;
    biometric information input sensors for acquiring biometric information of at least one kind from the authentication object user;
    a feature extraction function for extracting a feature from the acquired biometric information;
    a 1:N fast matching function for matching the feature of the authentication object user with the registered templates of the enrollees numbering a predetermined threshold K (K<N), wherein the 1:N fast matching function rearranges a matching sequence of the registered templates by referring to the score table;
    a delta score calculation function for calculating a delta score which represents how much two scores differ from each other, by using a score obtained for each of the registered templates by the 1:N fast matching and using the score table;
    a posterior probability calculation function for calculating posterior probabilities that the authentication object user will be same person as the respective enrollees, on the basis of the score and the delta score; and
    an authentication object user identification function for conducting identification processing of the authentication object user by comparing the posterior probabilities with a predetermined threshold A.

2. The biometric authentication system according to claim 1, wherein
    the prior probability setting function sets the prior probabilities inclusive of a prior probability that the authentication object user will be a non-enrollee, and
    the posterior probability calculation function calculates the posterior probabilities inclusive of a probability that the authentication object user will be a non-enrollee.

3. The biometric authentication system according to claim 2, wherein
    when the authentication object user is identified as a non-enrollee, the authentication object user identification function determines "impersonation" to be an identification result, and
    when whether the authentication object user is an enrollee or a non-enrollee cannot be identified, the authentication object user identification function determines "unsuccessful identification" to be an identification result.

4. The biometric authentication system according to claim 3, wherein
    the biometric information input sensors acquire one piece of biometric information of the authentication object user,
    the feature extraction function extracts one feature,
    the 1:N fast matching function, the delta score calculation function, the posterior probability calculation function and the authentication object user identification function conduct processing using the one feature, and
    if the authentication object user identification function determines "unsuccessful identification" to be an identification result, then the 1:N fast matching function, the delta score calculation function, the posterior probability calculation function and the authentication object user identification function repeat the processing on one feature acquired by the biometric information input sensors and extracted by the feature extraction function.

5. The biometric authentication system according to claim 1, wherein the authentication object user identification function determines an enrollee or a non-enrollee having a posterior probability which assumes a maximum value among the posterior probabilities exceeding the threshold A to be an identification result.

6. The biometric authentication system according to claim 1, wherein the authentication object user identification function determines "unsuccessful authentication" to be an identification result if a posterior probability exceeding the threshold A does not exist.

7. The biometric authentication system according to claim 1, wherein
    the biometric information input sensors acquire M pieces of the biometric information of the authentication object user,
    the feature extraction function extracts M feature, and
    the 1:N fast matching function, the delta score calculation function, the posterior probability calculation function and the authentication object user identification function conduct processing using the M feature.

8. The biometric authentication system according to claim 1, wherein scores between the registered templates numbering L (L<N) and the registered templates of other enrollees are recorded in the score table.

9. The biometric authentication system according to claim 1, wherein
    as for each of the enrollees having found scores, the posterior probability calculation function calculates a posterior probability by using the score and the delta score, and
    as for each of the enrollees having unfound scores, the posterior probability calculation function calculates a posterior probability by using the delta score.

10. The biometric authentication system according to claim 1, wherein
    as for each of the enrollees having found scores, the posterior probability calculation function calculates a posterior probability by using the score, and
    as for each of the enrollees having unfound scores, the posterior probability calculation function calculates a posterior probability by using the delta score.

11. The biometric authentication system according to claim 1, wherein the 1:N fast matching function rearranges the sequence of the registered templates to be matched by referring to the whole or a part of obtained scores.

* * * * *